US009065864B2

(12) United States Patent
Bryan

(10) Patent No.: US 9,065,864 B2
(45) Date of Patent: Jun. 23, 2015

(54) METHOD AND SYSTEM FOR TRANSMITTING A NETWORK-INITIATED MESSAGE TO A MOBILE DEVICE

(75) Inventor: Glen Bryan, Toronto (CA)

(73) Assignee: BCE Inc., Montreal (CA)

(*) Notice: Subject to any disclaimer, the term of this patent is extended or adjusted under 35 U.S.C. 154(b) by 422 days.

(21) Appl. No.: 13/336,295

(22) Filed: Dec. 23, 2011

(65) Prior Publication Data

US 2012/0173613 A1 Jul. 5, 2012

Related U.S. Application Data

(60) Provisional application No. 61/428,006, filed on Dec. 29, 2010.

(51) Int. Cl.
*G06F 15/16* (2006.01)
*H04L 29/08* (2006.01)

(52) U.S. Cl.
CPC ............ *H04L 67/26* (2013.01); *H04L 67/02* (2013.01)

(58) Field of Classification Search
CPC .............................. H04L 67/26; H04L 67/02
USPC .................................. 709/203, 206; 455/466
See application file for complete search history.

(56) References Cited

U.S. PATENT DOCUMENTS

| 6,757,545 | B2 | 6/2004 | Nowak et al. |
| 6,915,138 | B2 * | 7/2005 | Kraft ............................. 455/466 |
| 7,200,380 | B2 | 4/2007 | Havlark et al. |
| 2004/0059250 | A1 * | 3/2004 | Causevic et al. ............. 600/559 |
| 2004/0078481 | A1 * | 4/2004 | Rudd et al. .................... 709/238 |
| 2005/0255866 | A1 * | 11/2005 | Dupuy et al. .............. 455/456.6 |
| 2007/0106801 | A1 * | 5/2007 | Jansson ........................ 709/227 |
| 2007/0182547 | A1 | 8/2007 | Wachter et al. |
| 2007/0275732 | A1 | 11/2007 | Jethwa et al. |
| 2008/0113671 | A1 | 5/2008 | Ghozati et al. |
| 2008/0254809 | A1 | 10/2008 | Kraufvelin et al. |
| 2009/0005062 | A1 * | 1/2009 | Takaku et al. .............. 455/456.1 |
| 2009/0088181 | A1 | 4/2009 | Savolainen |
| 2009/0157472 | A1 * | 6/2009 | Burazin et al. .................. 705/10 |
| 2009/0215467 | A1 | 8/2009 | Shim et al. |
| 2009/0216846 | A1 | 8/2009 | Burroughs et al. |

OTHER PUBLICATIONS

Broadcom Corporation, "Secure User Plane Location", Oct. 2007, 24 pages.

(Continued)

*Primary Examiner* — David Lazaro
*Assistant Examiner* — Marie Georges Henry
(74) *Attorney, Agent, or Firm* — Gowling Lafleur Henderson LLP

(57) ABSTRACT

A method for execution by a network element of a communications network. The method comprises receiving from a first network entity a first communication that includes at least (i) a network-initiated message generated by a server-side portion of an application that also has a corresponding client-side portion and (ii) a first application identifier associated with the application. The method further comprises consulting a database based at least on the first application identifier in an attempt to identify a second application identifier associated with the application; and releasing to a second network entity a second communication that includes at least (i) the network-initiated message and (ii) either the second application identifier, if the attempt was successful, or the first application identifier, if the attempt was unsuccessful.

27 Claims, 15 Drawing Sheets

(56) References Cited

OTHER PUBLICATIONS

Wirola, Lauri, et al. "Requirements for the next generation standardized location technology protocol for location-based services", Journal of Global Positioning Systems (2008), vol. 7, No. 2 : 91-103.
Sagem Orga Launches New Native Client for Celltick's LiveScreen™ Media Application, Oct. 29, 2008, 2 pages.
Tony Haigh, "Unleashing the Hidden Power of the SIM Card", IDENTITEL Voice Bypass Newsletter, vol. 7, Issue 3, Third Quarter 2009, 5 pages.
"2010 North American Consumer Location-based Services (LBS) Market: The Wireless Carrier Opportunity", N68D-65, 2010 Frost & Sullivan, Chapters 1-4.
"2010 North American Consumer Location-based Services (LBS) Market: The Wireless Carrier Opportunity", N68D-65, 2010 Frost & Sullivan, Chapters 5-7.
Global System for Mobile Communications, "3rd Generation Partnership Project; Technical Specification Group Terminals; Technical realization of the Short Message Service (SMS)", (Release 1998), pp. 1-59.
Global System for Mobile Communications, "3rd Generation Partnership Project; Technical Specification Group Terminals; Technical realization of the Short Message Service (SMS)", (Release 1998), pp. 60-118.
Global System for Mobile Communications, "3rd Generation Partnership Project; Specification of the SIM Application Toolkit for the Subscriber Identity Module—Mobile Equipment (SIM—ME) interface", (Release 4), 83 pages.
Andrew Solutions GeoLENs™ Mobile Location Center, "White Paper, Location Services for Long Term Evolution", WP-103492-EN (10-09), 10 pages.
Open Mobile Alliance "UserPlane Location Protocol", Approved Version 1.0—Jun 15, 2007, OMA-TS-ULP-V1_0-20070615-A, 2007 Open Mobile Alliance Ltd., 52 pages.
"Short Message Peer to Peer Protocol Specification", v3.4, Document Version:—Oct. 12, 1999 Issue 1.2., 1999 SMPP Developers Forum, pp. 1-108.
"Short Message Peer to Peer Protocol Specification", v3.4, Document Version:—Oct. 12, 1999 Issue 1.2., 1999 SMPP Developers Forum, pp. 109-169.
ETSI, "Smart Cards; UICC-Terminal interface; Physical and logical characteristics", (Release 8), ETSI TS 102 221 V8.3.0, pp. 1-76.
ETSI, "Smart Cards; UICC-Terminal interface; Physical and logical characteristics", (Release 8), ETSI TS 102 221 V8.3.0, pp. 77-174.
ETSI, "Smart Cards; Secured packet structure for UICC based applications", (Release 8), ETSI TS 102 225 V8.2.0, 21 pages.
WAPTM WSP, "Wireless Application Protocol, Wireless Session Protocol Specification", WAP-230-WSP, Approved Version Jul. 5, 2001, pp. 1-66.
WAPTM WSP, "Wireless Application Protocol, Wireless Session Protocol Specification", WAP-230-WSP, Approved Version Jul. 5, 2001, pp. 67-131.
WAP, "Push Access Protocol, Version Apr. 29, 2001", WAP-247-PAP-20010429-a, 49 pages.
International Search Report mailed on Apr. 7, 2011 in connection with International Patent Application PCT/CA2010/002076, 3 pages.
Written Opinion of the International Searching Authority mailed on Apr. 7, 2011 in connection with International Patent Application PCT/CA2010/002076, 5 pages.

\* cited by examiner

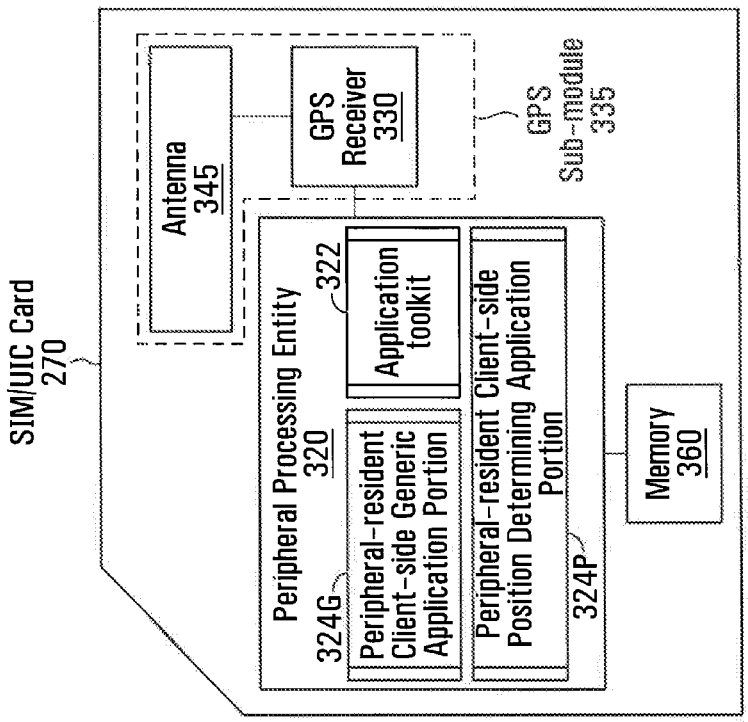
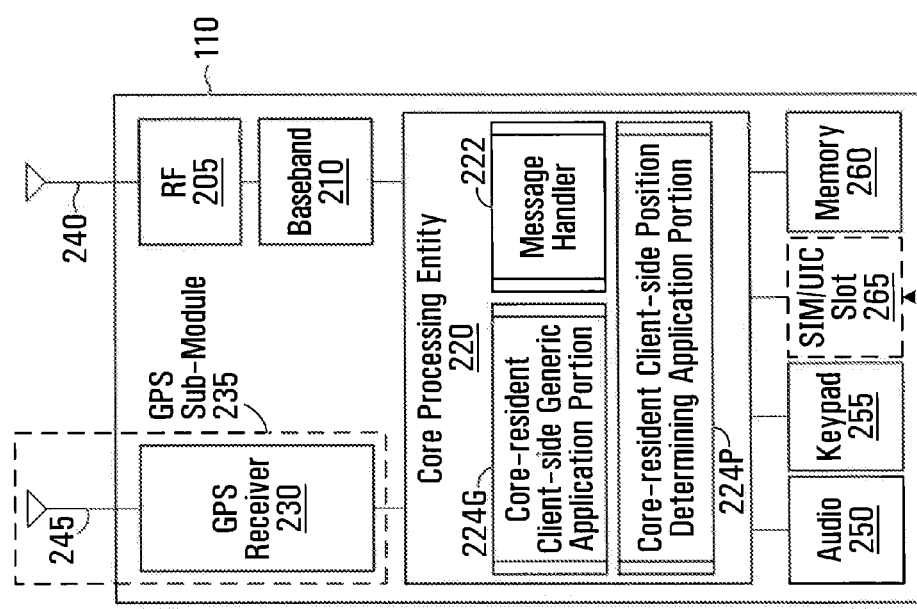
FIG. 3
FIG. 2

```
chan_type = 0
trans_id_or_skip_ind = 0
prot_disc = 9 (GSM_SMS_MESSAGES)
msg_type = 1
prot
  sms_prot
    sms_cp_data
      sms_cp_user_data
        length = 133
        rp_message
          mti = 1
          message_reference = 1
          sms_rp_message_body
            rp_data_to_ue
```

| | |
|---|---|
| orig_addr | |
|   length = 7 | |
|   ext = 1 | |
|   type = 1 | |
|   num_plan_id = 1 | |
|   number[0] = 1 | |
|   number[1] = 2 | |
|   number[2] = 8 | |
|   number[3] = 9 | |
|   number[4] = 3 | |
|   number[5] = 2 | |
|   number[6] = 5 | |
|   number[7] = 5 | |
|   number[8] = 0 | |
|   number[9] = 1 | |
|   number[10] = 1 | |
|   number[11] = 0 | |

Medium Access Control Layer Data Element 582

```
dest_addr
  length = 0
user_data
  length = 126
sms_tpdu_prot
  mti = 0
  sm_tl_sms_deliver
    reply_path = 0
    udh_indicator = 1
    stat_rep_indicator = 0
    more_messages = 1
    orig_address
      length = 5
      type_of_number = 0
```

SMS 550

```
user_data_8_bit[20] = 109 (0x6d) (0155)    m
user_data_8_bit[21] = 97  (0x61) (0141)    a
user_data_8_bit[22] = 108 (0x6c) (0154)    l
user_data_8_bit[23] = 111 (0x6f) (0157)    o
user_data_8_bit[24] = 99  (0x63) (0143)    c
user_data_8_bit[25] = 45  (0x2d) (055)     -
user_data_8_bit[26] = 115 (0x73) (0163)    s
user_data_8_bit[27] = 117 (0x75) (0165)    u
user_data_8_bit[28] = 112 (0x70) (0160)    p
user_data_8_bit[29] = 108 (0x6c) (0154)    l
user_data_8_bit[30] = 45  (0x2d) (055)     -
user_data_8_bit[31] = 105 (0x69) (0151)    i
user_data_8_bit[32] = 110 (0x6e) (0156)    n
user_data_8_bit[33] = 105 (0x69) (0151)    i
user_data_8_bit[34] = 116 (0x74) (0164)    t
user_data_8_bit[35] = 0   (0x0)  (00)      end of string user_data_8_bit[36] = 175 (0xaf) (0257)    WSP header name: X-WAP-Application-ID
user_data_8_bit[37] = 120 (0x78) (0170)    x
user_data_8_bit[38] = 45  (0x2d) (055)     -
user_data_8_bit[39] = 111 (0x6f) (0157)    o
user_data_8_bit[40] = 109 (0x6d) (0155)    m
user_data_8_bit[41] = 97  (0x61) (0141)    a
user_data_8_bit[42] = 45  (0x2d) (055)     -
user_data_8_bit[43] = 97  (0x61) (0141)    a
user_data_8_bit[44] = 112 (0x70) (0160)    p
user_data_8_bit[45] = 112 (0x70) (0160)    p
user_data_8_bit[46] = 108 (0x6c) (0154)    l
user_data_8_bit[47] = 105 (0x69) (0151)    i
user_data_8_bit[48] = 99  (0x63) (0143)    c
user_data_8_bit[49] = 97  (0x61) (0141)    a
user_data_8_bit[50] = 116 (0x74) (0164)    t
user_data_8_bit[51] = 105 (0x69) (0151)    i
user_data_8_bit[52] = 111 (0x6f) (0157)    o
user_data_8_bit[53] = 110 (0x6e) (0156)    n
user_data_8_bit[54] = 58  (0x3a) (072)     :
user_data_8_bit[55] = 117 (0x75) (0165)    u
user_data_8_bit[56] = 108 (0x6c) (0154)    l
user_data_8_bit[57] = 112 (0x70) (0160)    p
user_data_8_bit[58] = 46  (0x2e) (056)     .
user_data_8_bit[59] = 117 (0x75) (0165)    u
user_data_8_bit[60] = 97  (0x61) (0141)    a
user_data_8_bit[61] = 0   (0x0)  (00)      end of string
```

Application Identifier Data Element 504

```
user_data_8_bit[62] = 0 (0x0) (00)    OMA UserPlane Location Protocol
```

FIG. 7C

```
user_data_8_bit[63]  = 34  (0x22)  (042)                ULP-PDU
user_data_8_bit[64]  = 1   (0x1)   (01)                    length: 34
user_data_8_bit[65]  = 0   (0xC)   (00)                    version
user_data_8_bit[66]  = 0   (0xC)   (00)                       maj: 1
user_data_8_bit[67]  = 64  (0x40)  (0100)                     min: 0
user_data_8_bit[68]  = 250 (0xfa)  (0372)                     servind: 0
user_data_8_bit[69]  = 192 (0xcC)  (0300)                  sessionId
user_data_8_bit[70]  = 0   (0xC)   (00)                       sipSessionID
user_data_8_bit[71]  = 208 (0xd0)  (0320)                        sessionID: 03EB0003
user_data_8_bit[72]  = 254 (0xfe)  (0376)                        sipId: FQDN (1)
user_data_8_bit[73]  = 58  (0x3a)  (072)                            FQDN: suplibs-tdlab.ca
user_data_8_bit[74]  = 215 (0xd7)  (0327)               message: msSUPLINIT
user_data_8_bit[75]  = 28  (0x1c)  (034)                   msSUPLINIT
user_data_8_bit[76]  = 103 (0x67)  (0147)                     posMethod: agpsSETassistedpref (2)
user_data_8_bit[77]  = 224 (0xeC)  (0340)                     notification
user_data_8_bit[78]  = 30  (0x1e)  (036)                         notificationType:
                                                                   notificationAndVerificationAllowedNA (2)
user_data_8_bit[79]  = 105 (0x69)  (0151)                            encodingType: utf8 (2)
user_data_8_bit[80]  = 198 (0xc6)  (0306)                            clientName: 3535
user_data_8_bit[81]  = 105 (0x69)  (0151)                            clientNameType: logicalName (0)
user_data_8_bit[82]  = 193 (0xc1)  (0300)                     qop
user_data_8_bit[83]  = 162 (0xa2)  (0242)                        horacc: 4
user_data_8_bit[84]  = 96  (0x60)  (0140)                        veracc: 47
user_data_8_bit[85]  = 80  (0x50)  (0120)                        maxLocAge: 30
user_data_8_bit[86]  = 73  (0x49)  (0111)                        delay: 5
user_data_8_bit[87]  = 146 (0x92)  (0222)                     SLPMode: proxy (0)
user_data_8_bit[88]  = 4   (0x04)  (04)
user_data_8_bit[89]  = 212 (0xd4)  (0324)
user_data_8_bit[90]  = 28  (0x1c)  (034)
user_data_8_bit[91]  = 34  (0x22)  (042)
user_data_8_bit[92]  = 240 (0xf0)  (0360)
user_data_8_bit[93]  = 1   (0x01)  (01)
user_data_8_bit[94]  = 234 (0xea)  (0352)
```

SUPL INIT 506

FIG. 7D

```
chan_type = 0
trans_id_or_skip_ind = 0
prot_disc = 9 (GSM_SMS_MESSAGES)
msg_type = 1
prot
  sms_prot
    sms_cp_data
      length = 114
      rp_message
        mti = 1
        message_reference = 1
        sms_rp_message_body
          rp_data_to_ue
            orig_addr                          ┌─────────────────────────────┐
              length = 7                       │  Medium Access Control Layer│
              ext = 1                          │       Data Element          │
              type = 1                         │           582               │
              num_plan_id = 1                  │                             │
              number[0] = 1                    │                             │
              number[1] = 4                    │                             │
              number[2] = 3                    │                             │
              number[3] = 8                    │                             │
              number[4] = 2                    │                             │
              number[5] = 7                    │                             │
              number[6] = 6                    │                             │
              number[7] = 2                    │                             │
              number[8] = 0                    │                             │
              number[9] = 0                    │                             │
              number[10] = 0                   │                             │
              number[11] = 15                  │                             │
            dest_addr                          └─────────────────────────────┘
              length = 0
            user_data
              length = 101
              sms_tpdu_prot
                mti = 0
                sm_ti_sms_deliver
                  reply_path = 0
                  udh_indicator = 1
                  stat_rep_indicator = 0
                  more_messages = 1
                  orig_address
                    length = 5
```

SMS
560

FIG. 8A

```
type_of_number = 6
number_plan_id = 1
addr_value[0] = 4
addr_value[1] = 4
addr_value[2] = 6
addr_value[3] = 1
addr_value[4] = 3
addr_value[5] = 15
prot_id = 127 (unknown)
data_coding_scheme = 246 (0xf6) (0x16 data coding=1, class=2)
serv_cent_time_stamp_date = 9437442 (0x9001021) (10/20/09)
serv_cent_time_stamp_time = 5309572 (0x5104841) (15:40:48)
serv_cent_time_stamp_tz = 105 (0x69) (0x69 -05:30)
```

HDR2
562

```
tp_user_data
    user_data_len = 49
    sm_tp_user_data_ascii_8
        udhl = 2
        num_ies = 1
        info_elements[0]
            iei = 112 (0x70) (USIM_TOOLKIT_SEC_HDRS_0)
            usim_toolkit_sec_hdrs user_data_8_bit[0] = 0 (0x0) (00)
                user_data_8_bit[1] = 46 (0x2e) (056)    (0x002e) Command Packet Length -> 46
                                                               octets
                user_data_8_bit[2] = 13 (0x0d) (015)    (0x0d)  Command Header Length -> 15
                                                               octets
                user_data_8_bit[3] = 0 (0x0)  (00)      (0x00)  Security Parameter Index
                                                               - No RC, CC or DS
                                                               - No Ciphering
                                                               - No Counter available
                user_data_8_bit[4] = 33 (0x21) (041)    (0x21)  PoR (Proof of Receipt)
                                                               required to be sent to the SE
                                                               (Sending Entity)
                                                               - No security applied to PoR
                                                                 response to SE
                                                               - PoR response shall not be
                                                                 ciphered
                                                               - PoR response shall be sent
                                                                 using SMS-SUBMIT
                user_data_8_bit[5] = 5 (0x5) (05)       (0x05)  Ciphering Key Identifier (KIC)
                                                               - DES
                                                               - Triple DES in outer-CBC mode
                                                                 using two different keys
```

SPS
548

FIG. 8B

```
user_data_8_bit[6]  = 5    (0x5)  (05)         (0x05) Key Identifier (KID)
                                                - DES
                                                - Triple DES in outer-CBC mode
                                                  using two different keys
                                                - Keyset to be used is CxC0
user_data_8_bit[7]  = 192  (0xc0) (0300)       (0xc00001) Toolkit Application
                                                  Reference (TAR)
```

Toolkit Reference Data Element 544

```
user_data_8_bit[8]  = 0    (0x0)  (00)         - SUPL Client (This is only an
                                                  example. The SUPL client
                                                  vendor must assign the TAR.)

user_data_8_bit[9]  = 1    (0x1)  (01)         (0x00000000) Counter (CNTR) not used.
user_data_8_bit[10] = 0    (0x0)  (00)
user_data_8_bit[11] = 0    (0x0)  (00)
user_data_8_bit[12] = 0    (0x0)  (00)
user_data_8_bit[13] = 0    (0x0)  (00)
user_data_8_bit[14] = 0    (0x0)  (00)
user_data_8_bit[15] = 0    (0x0)  (00)         (0x00) Padding counter (PCNTR)
```

SUPL INIT 506

```
user_data_8_bit[16] = 0    (0x0)  (00)         OMA UserPlane Location Protocol
user_data_8_bit[17] = 34   (0x22) (042)        ULP-PDU
user_data_8_bit[18] = 1    (0x1)  (01)           length: 34
user_data_8_bit[19] = 0    (0x0)  (00)           version
user_data_8_bit[20] = 0    (0xC0) (00)             maj: 1
user_data_8_bit[21] = 64   (0x40) (0100)           min: 0
user_data_8_bit[22] = 250  (0xfa) (0372)           servind: 0
user_data_8_bit[23] = 192  (0xc0) (0300)         sessionID
user_data_8_bit[24] = 0    (0x0)  (00)             slpSessionID
user_data_8_bit[25] = 208  (0xd0) (0320)             sessionID: 03E30003
user_data_8_bit[26] = 254  (0xfe) (0376)             slpId: fQDN (1)
user_data_8_bit[27] = 58   (0x3a) (072)                fQDN: suplbs.tdlab.ca
user_data_8_bit[28] = 215  (0xd7) (0327)         message: msSUPLINIT (0)
user_data_8_bit[29] = 28   (0x1c) (034)          msSUPLINIT
user_data_8_bit[30] = 103  (0x67) (0147)           posMethod: agpsSETassistedpref (2)
user_data_8_bit[31] = 224  (0xe0) (0340)           notification
user_data_8_bit[32] = 30   (0x1e) (036)              notificationType:
                                                       notificationAndVerifi
                                                       cationAllowedNA (2)
                                                     encodingType: utf8
user_data_8_bit[33] = 105  (0x69) (0151)               (2)
                                                     clientName: 3535
user_data_8_bit[34] = 198  (0xc6) (0306)             clientNameType:
user_data_8_bit[35] = 105  (0x69) (0151)               logicalName (0)
```

METHOD AND SYSTEM FOR TRANSMITTING A NETWORK-INITIATED MESSAGE TO A MOBILE DEVICE

CROSS-REFERENCE TO RELATED APPLICATION(S)

The present application claims the benefit under 35 USC §119(e) of U.S. Provisional Patent Application Ser. No. 61/428,006, filed Dec. 29, 2010, hereby incorporated by reference herein.

FIELD OF THE INVENTION

The present invention relates generally to the transmission of messages in communications networks and, more particularly, to the processing of network-initiated messages destined for a communication device.

BACKGROUND

In a communications network, there is often a need to send a network-initiated message to a communication device. For example, the communication device may host a client-side application portion that cooperates with a server-side application portion to implement a particular application, such as a position determining application. At certain times, the server may request the location of the communication device, and correspondingly issues a message (such as a SUPL INIT message) destined for the client-side application. The client-side application portion receives the SUPL INIT message and responds by collecting the location parameters and establishing a secure user plane connection with the server-side application portion, over which the location parameters of the communication device can be securely transported to the server.

The client-side portions of applications, such as the client-side portion of the position determining application described above, are traditionally executed by core processing circuitry of the communication device. This is where most of the processing power, control logic and interface functionality is concentrated. However, peripheral devices are becoming increasingly versatile and are being equipped with enhanced functionalities. This is the case with SIM/UIC cards, which are being manufactured with the capability to support client-side portions of applications, such as the client-side portion of the position determining application described above.

When dealing with advanced peripherals, it becomes necessary to modify the formatting scheme used to address messages sent to the device in order to allow the core processing circuitry of the device to distinguish between network-initiated messages destined for a client-side application portion resident on the peripheral (e.g., the SIM/UIC card) and network-initiated messages destined for a client-side portion resident on the core processing circuitry itself.

However, many service providers have made considerable investments into servers and other infrastructure that predates the trend of placing client-side applications on peripherals. As a result, many legacy systems are programmed to format network-initiated messages as if the client-side application portion for which they were destined were always being executed by core processing circuitry. In order to adapt their systems to modern SIM/UIC cards, service providers are faced with the prospect of re-programming, re-integrating and re-debugging their servers, which implies added costs, possible downtime and a potentially decreased robustness.

Against this background, it would be desirable to provide a solution that allows service providers to preserve legacy equipment, while fully benefiting from the enhanced capabilities of current and future peripherals.

SUMMARY OF THE INVENTION

According to a first broad aspect, the present invention seeks to provide an apparatus comprising: an input for receiving from a first network entity a first communication that includes at least (i) a network-initiated message generated by a server-side portion of an application that also has a corresponding client-side portion and (ii) a first application identifier associated with the application; a processing entity for consulting a database based at least on the first application identifier in an attempt to identify a second application identifier associated with the application; and an output for releasing to second network entity a second communication that includes at least (i) the network-initiated message and (ii) either the second application identifier, if the attempt was successful, or the first application identifier, if the attempt was unsuccessful.

According to a second broad aspect, the present invention seeks to provide a method for execution by a network element, of a communications network, the method comprising: receiving from a first network entity a first communication that includes at least (i) a network-initiated message generated by a server-side portion of an application that also has a corresponding client-side portion and (ii) a first application identifier associated with the application; consulting a database based at least on the first application identifier in an attempt to identify a second application identifier associated with the application; and releasing to a second network entity a second communication that includes at least (i) the network-initiated message and (ii) either the second application identifier, if the attempt was successful, or the first application identifier, if the attempt was unsuccessful.

According to a first broad aspect, the present invention seeks to provide a non-transitory computer-readable storage medium comprising a set of instructions for execution by a network element of a communications network, wherein execution of the set of instructions by the network element causes the network element to execute the aforementioned method.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 2 is a block diagram of a communication device, in accordance with a specific non-limiting embodiment of the present invention, including a SIM/UIC card slot for receiving a SIM/UIC card;

FIG. 3 is a block diagram of a SIM/UIC card, in accordance with a specific non-limiting embodiment of the present invention;

Figure 7B:
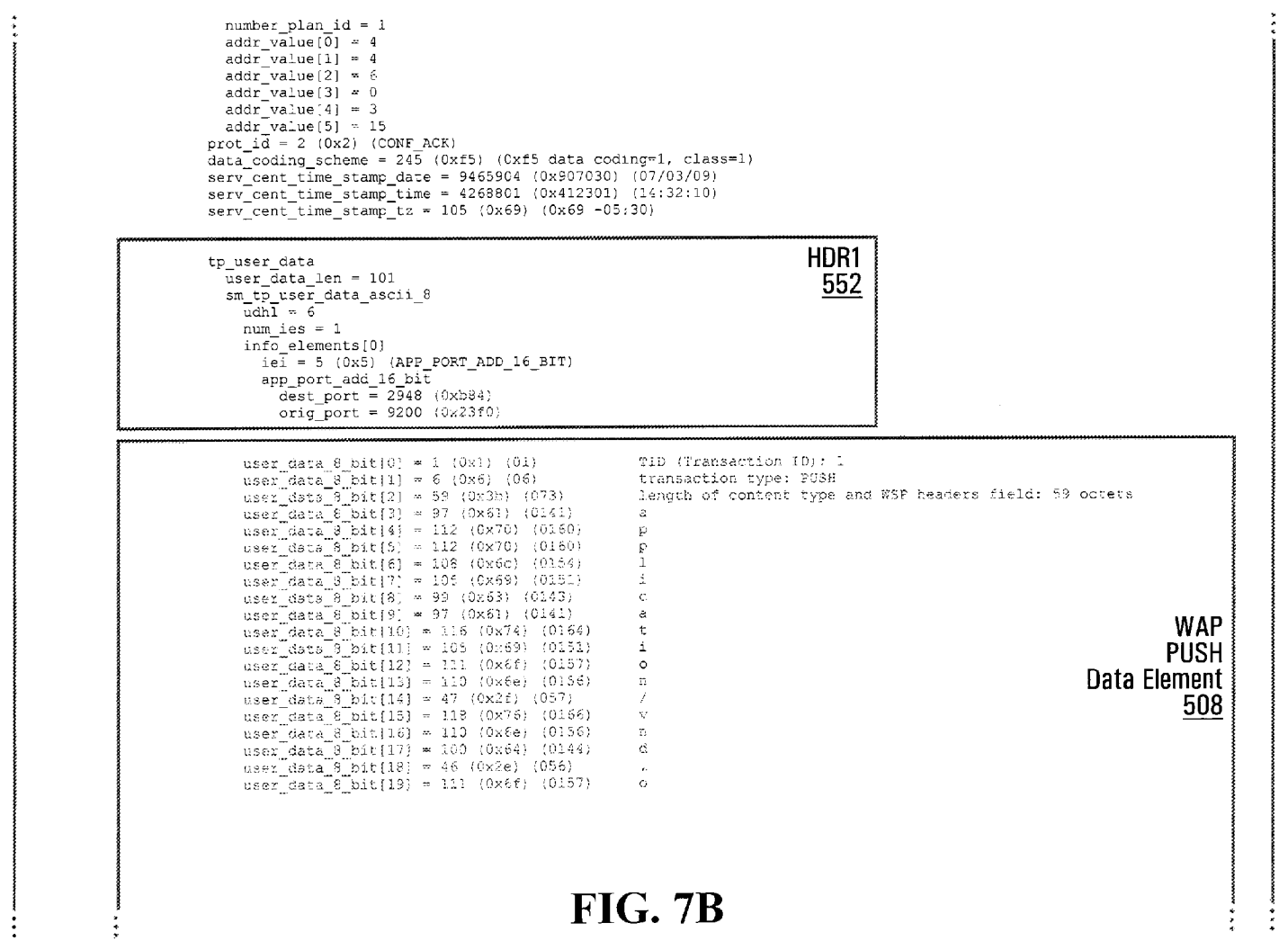

FIGS. 7A-7D show contents of an example SMS message in the case where the client-side portion of a given application is executed by core processing circuitry, in accordance with a specific non-limiting embodiment of the present invention;

FIGS. 8A-8D show contents of an example SMS message in the case where the client-side portion of a given application is executed by peripheral processing circuitry, in accordance with a specific non-limiting embodiment of the present invention;

DETAILED DESCRIPTION

Figure 1:
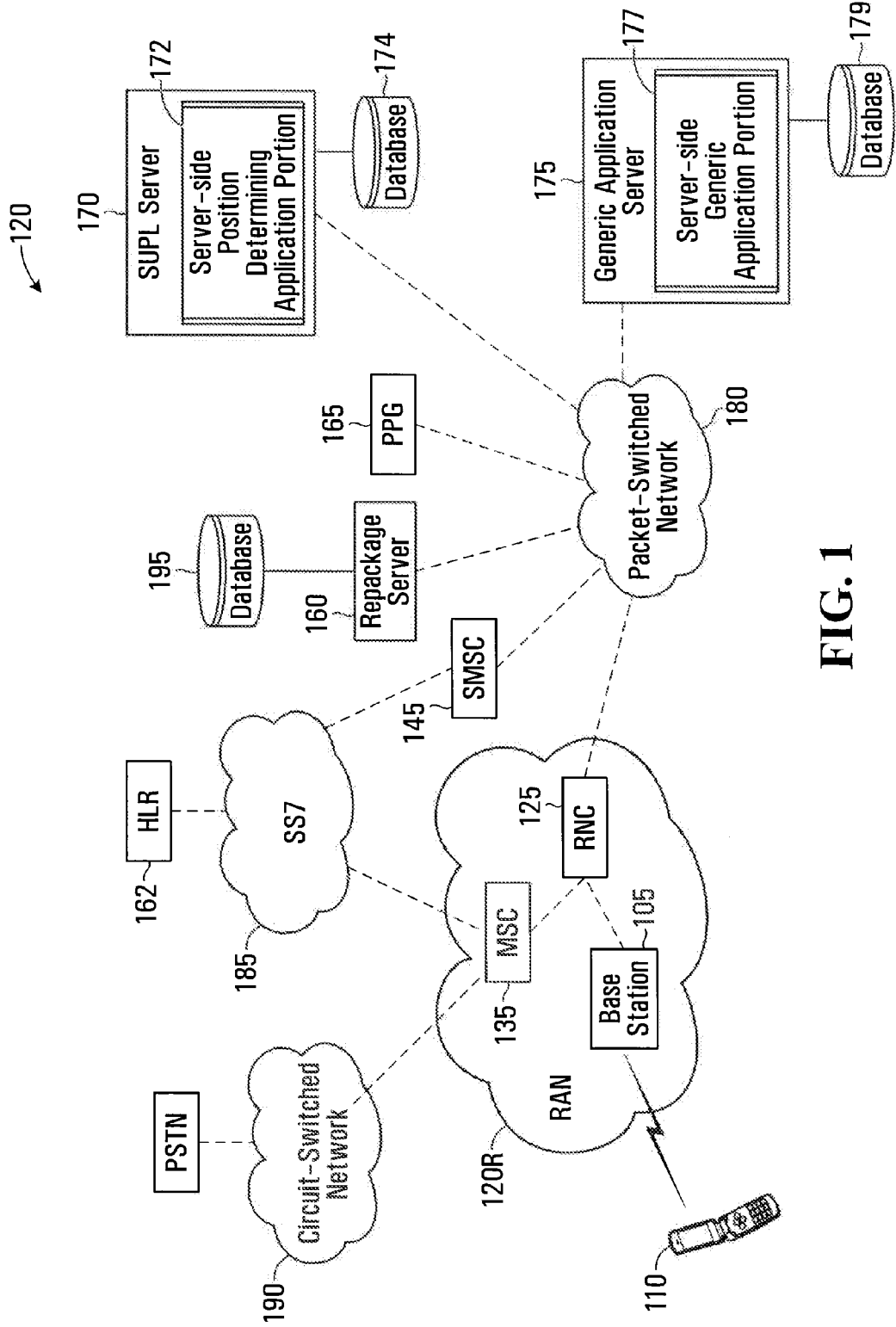
FIG. 1 is a block diagram of a wireless communications network, in accordance with a specific non-limiting embodiment of the present invention.

FIG. 1 shows a wireless communications network 120, in accordance with a specific non-limiting embodiment of the present invention. The components of the wireless communications network 120 may abide by a standard, such as 3GPP, 802.16, 802.16e and/or 802.16m, to name a few non-limiting possibilities. The present invention may also be applicable in a WiMax (IEEE 802.11m) environment. In the following, if certain terms are more reflective of 3GPP, this is to merely facilitate understanding and is not to be considered as a limitation or restriction of the present invention.

The network 120 allows a service provider to deliver of wireless communication services to a device 110. Device 110 can be a wireless device such as a mobile phone, smart phone, BlackBerry™ wireless handheld communication device, iPhone™ wireless handheld communication device, iPad™ tablet, WiFi™-enabled laptop, etc. Device 110 can be associated with a subscription from a wireless carrier, thus device 110 can be referred to as a subscriber device or subscriber station.

A non-limiting example of device 110 is shown in more detail in FIG. 2. Device 110 comprises, among other components, a radio frequency (RF) antenna 240, RF transceiver circuitry 205, baseband modulation/demodulation circuitry 210, a processing entity (in this case referred to as a core processing entity 220) and a memory 260. An audio device 250 and a keypad 255 can provide input/output functionality as can a variety of other devices known to those of skill in the art. A touch screen could also be used.

The core processing entity 220 provides functionality that can be implemented by a microprocessor or other arrangement of circuitry, possibly configured to execute a program of machine-readable instructions stored in the memory 260. The memory 260 can also store data for use by the core processing entity 220 during execution of its program. The memory 260 may also store information that characterizes device 110 (and/or the subscription), such as a MEID (Mobile Equipment Identifier), IMSI (International Mobile Subscriber Identifier), directory number (e.g., MSISDN), account information, etc., as well as possibly various user-entered information (such as a contact list, task list, password vault, etc.) Various ways of implementing the functionality of the core processing entity 220 and the memory 260 will be apparent to those of skill in the art.

Device 110 may be equipped with a global positioning system (GPS) sub-module 235, which includes an antenna 245 and a UPS receiver 230. In some embodiments, a separate UPS antenna is not required, and the UPS receiver 230 in GPS sub-module 235 may share the antenna 240 with the RF transceiver circuitry 205. The GPS receiver 230 is configured to demodulate and process signals from various earth-orbiting satellites, as received by the antenna 245 (or 240, as the case may be), in order to derive information characterizing the current location of device 110. The core processing entity 220 controls operation of the UPS receiver 230 based on parameters received from a requesting entity in the network 120, and relays the information obtained from the UPS receiver 230 to such requesting entity.

Device 110 may comprise a peripheral capable of running a client application. In one embodiment, the peripheral may comprise a subscriber identity module (SIM) or universal integrated circuit (UIC) card 270, hereinafter referred to as a SIM/UIC card 270, insertable into a SIM/UIC card slot 265. Slot 265 provides one or more connections to the core processing entity 220 so as to allow communication between the core processing entity 220 and the SIM/UIC card 270 when the latter is inserted into slot 265. For example, a communications bus can be provided for enabling communications between the core processing entity 220 and the SIM/UIC card 270. Communication over such communications may be carried out in accordance with a communications protocol, a non-limiting example being the Bearer Independent Protocol (BIP), as described in ETSI TS 102 223: "Smart Cards; Card Application Toolkit (CAT) (Release 7)", hereby incorporated by reference herein. Other protocols may also be used.

In a variant, the peripheral capable of running a client application may be connectable to device 110 through a port (such as a USB port) or wirelessly (e.g., via a WiFi™-enabled connection).

A non-limiting example of the SIM/UIC card 270 is shown in FIG. 3 in block diagram form. The SIM/UIC card 270 includes a processing entity (in this case referred to as a peripheral processing entity 320) and a memory 360. The memory 360 may store information that characterizes device 110 (and/or the subscription), such as a MEID (Mobile Equipment Identifier), IMSI (International Mobile Subscriber Identifier), ICCID (Integrated Circuit Card Identifier), directory number (e.g., MSISDN), account information, etc., as well as possibly various user-entered information (such as a contact list, task list, password vault, etc.). The peripheral processing entity 320 executes functionality that can be implemented by a microprocessor or other arrangement of circuitry, possibly configured to execute a program of machine-readable instructions stored in the memory 360. The memory 360 can also store data for use by the peripheral processing entity 320 during execution of its program. Various ways of implementing the functionality of the peripheral processing entity 320 and the memory 360 will be apparent to those of skill in the art.

The SIM/UIC card 270 may additionally include a GPS sub-module 335, which includes an antenna 345 and a GPS receiver 330. The UPS receiver 330 is configured to demodulate and process signals from various earth-orbiting satellites, as received by the antenna 345, in order to derive information characterizing the location of the SIM/UIC card 270 and therefore of device 110 itself (when the SIM/UIC card 270 is installed in slot 265). The peripheral processing entity 320 controls operation of the GPS receiver 330 based on parameters received from a requesting entity in the network 120 (via the core processing entity 220), and relays the information obtained from the GPS receiver 330 to such requesting entity (also via the core processing entity 220.

With reference again to FIG. 2, the core processing entity 220 in the core circuitry of device 110 may execute various functionalities. These may include a message handler 222, a core-resident client-side position determining application portion 224P and one or more core-resident client-side generic application portions 2240. Similarly, the peripheral processing entity 320 in the SIM/UIC card 270 may execute various functionalities, which may include an application toolkit 322, a peripheral-resident client-side position determining application portion 324P and one or more peripheral-resident client-side generic application portions 324G.

Figure 9:
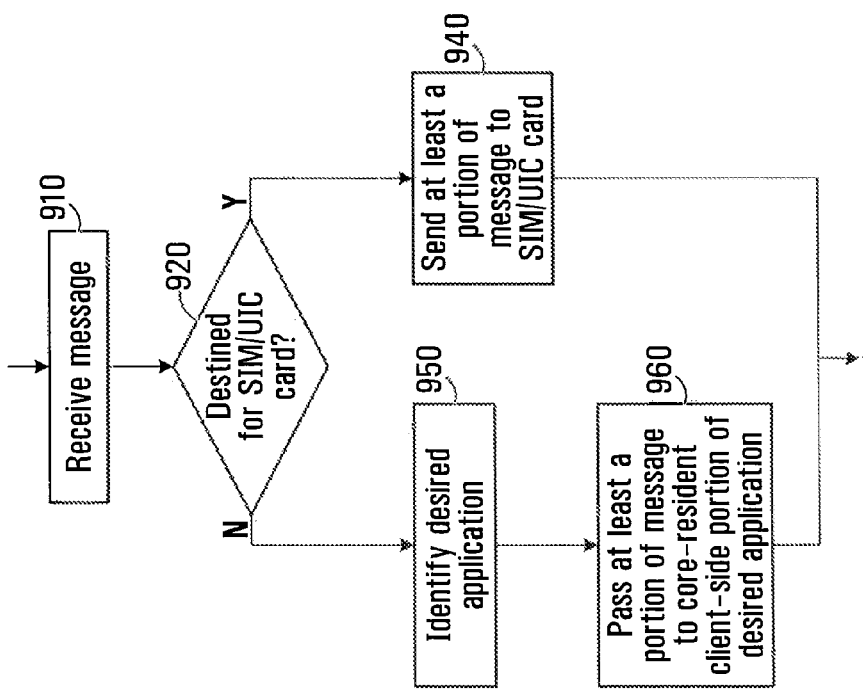
FIG. 9 is a flowchart illustrating operation of a message handler on the communication device, in accordance with a specific non-limiting embodiment of the present invention.

The message handler 222 executed by the core processing entity 220 processes messages received via the RF antenna 240 in a manner described with reference to FIG. 9. In particular, at step 910, the message handler 222 receives a message. At step 920, the message handler 222 determines (e.g., from the contents of the message), whether the message is destined for a peripheral (e.g., the SIM/UIC card 270). If the message is found to be destined for the SIM/UIC card 270, the message handler 222 proceeds to step 940, where the message handler 222 sends at least a portion of the message over the communication bus to the application toolkit 322 on the SIM/UIC card 270. The message handler 222 may apply formatting in accordance with a communications protocol such as the Bearer Independent Protocol (BIP) referred to above.

On the other hand, if the received message is found not to be destined for the SIM/UIC card 270, the message handler 222 proceeds to step 950, where the message handler 222 identifies the desired application (e.g., based on an application identifier contained in the message). For example, the desired application may be the position determining application or one of the generic applications. This is followed by step 960, where the message handler 222 passes at least a portion of the message to a core-resident client-side portion of the desired application, which can be the core-resident client-side position determining application portion 224P or one of the core-resident client-side generic application portions 224G, as the case may be. This can involve launching the appropriate core-resident client-side application portion, reviving the appropriate core-resident client-side application portion (if it was dormant) or simply storing a portion of the message in an area of the memory 260 allocated to the appropriate core-resident client-side application portion.

Figure 10:
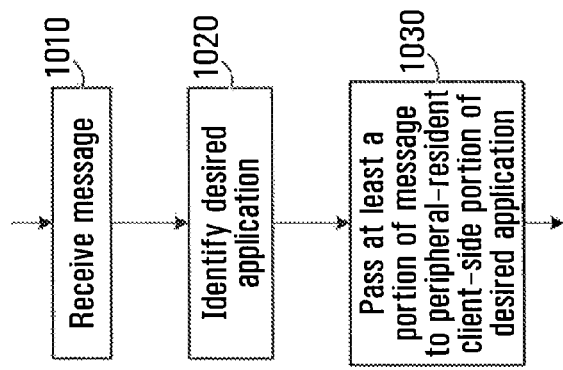
FIG. 10 is a flowchart illustrating operation of an application toolkit on the SIM/UIC card, in accordance with a specific non-limiting embodiment of the present invention.

For its part, the application toolkit 322 executed by the peripheral processing entity 320 processes messages in a manner described with reference to FIG. 10. Some of the message processing functionality of the application toolkit 322 is analogous to that the message handler 2.22. In particular, at step 1010, the application toolkit 322 receives a message from the core processing entity 220. Since this message was sent by the message handler 222, it may be in somewhat of a different format that the message originally received by the message handler 222 from which it was derived. At step 1020, the application toolkit 322 identifies the desired application (e.g., based on an application identifier contained in the message). For example, the desired application may be the position determining application or one of the generic applications. This is followed by step 1030, where the application toolkit 322 passes at least a portion of the message to a peripheral-resident client-side portion of the desired application, which can be the peripheral-resident client-side position determining application portion 324P or one of the peripheral-resident client-side position determining application portions 324G, as the case may be. This can involve launching the appropriate peripheral-resident client-side application portion, reviving the appropriate peripheral-resident client-side application portion (if it was dormant) or storing a portion of the message in an area of the memory 260 allocated to the appropriate peripheral-resident client-side application portion.

Returning now to FIG. 1, the wireless communication network 120 includes a radio access network 120R. The radio access network 120S includes various nodes such as a plurality of radio network controllers and base stations, among which is shown is a radio network controller (RNC) 125 connected to a base station 105.

The base station 105 irradiates a wireless coverage area such as a cell or cell/sector in which device 110 can communicate with the base station 105 over an air interface. The base station 105 is communicatively coupled to (or integrated with) the radio network controller 125. The radio network controller 125 controls aspects of the air interface (such as channel assignments and handoff). The radio network controller 125 is communicatively coupled to a mobile switching center (MSC) 135 and also to a packet switched network 180.

The MSC 135 carries out signaling and control functions for processing mobile voice calls and data messages. Specifically, the MSC 135 maintains calls and transfers data messages between a mobile user within its serving area (e.g., a user of device 110) and either a fixed (landline) user, another mobile entity or an entity on the Internet. To this end, the MSC 135 can be connected to other MSCs (not shown) in the radio access network 120R. The MSC 135 can also be connected to a circuit-switched network 190 such as the PSTN, allowing telephone calls to be established between device 110 and landline devices. The MSC 135 can also be connected to a control signaling network such as a "Signalling System #7" (SS7) network 185.

The SS7 network 185 routes signalling messages between the MSC 135 and various entities, such as a home location register (HLR) 162 and a short message service center (SMSC) SMSC 145. Some of these signalling messages are used for call setup and teardown. Also, some of these signalling messages are used to transport data from the SMSC 145 to the MSC 135 for delivery to device 110, or vice versa.

In the wireless communication network of FIG. 1, every entity on one of the networks (circuit-switched network 190, SS7 network 185 and packet-switched network 180) is expected to have an address. The circuit-switched network 190, the MSC 135 and the SS7 network 185 use point-code addresses, whereas the packet-switched network 180 uses IP addresses. Most entities have either an IP address or point-code address, but not both. However, some entities have both and they are called gateways. In FIG. 1, the SMSC 145 is a gateway, since it is connected to both the 557 network 185 and the packet-switched network 180.

In its function as a gateway, the SMSC 145 can send messages in a variety of different ways, depending on their source and destination. For example, messages exchanged between the SMSC 145 and device 110 as well as other devices in the radio access network 1208. can abide by a protocol such as SMS ("short message service", as described in 3GPP TS 0340 V705.0 (2001-12), 3rd Generation Partnership Project; Technical Specification Group Terminals; Technical realization of the Short Message Service (SMS); Release 1998, hereby incorporated by reference herein). Messages of this nature are referred to as SMS messages and can be used to transport text, web links (URLs) and multimedia service (MMS) notifications (to name a few non-limiting possibilities). In addition, as will be described in further detail below, SMS messages can be used to transport a variety of appropriately formatted application data or control information.

The SMSC 145 can also exchange messages with entities outside the radio access network 1208, such as entities in the packet-switched network 180. This can be achieved using a protocol such as SMPP (Short Message Peer to Peer Protocol Specification v3.4, 12 Oct. 1999 Issue 1.2, © 1999 SMPP Developers Forum, hereby incorporated by reference herein). SMPP is an open message-transfer protocol that defines a set of operations for the exchange of SMS messages between the SMSC 145 and peer entities (e.g., in the packet-switched network 180), as well as the data that the peer entities are required to exchange with the SMSC 145 during SMPP operations.

To determine the location of the recipient of a given message received over the packet data network 180, the SMSC 145 may request routing information from the HLR 162, which is accessible via the previously mentioned 557 network 185. Specifically, the HLR 162 may contain the point-code address of the MSC 135 currently serving device 110.

The packet-switched network 180 may include entities such as a serving GPRS (General Packet Radio Service) support node (SGSN), a gateway GPRS support node (GGSN), a Gateway Mobile Location Center (GMLC) and so on. One or more gateways (not shown) may be provided that connect the packet-switched network 180 to an external data network such as the Internet (not shown).

Also connected to the packet-switched network 180 may be a Secure User Plane Location (SUPL) server 170, a generic application server 175, a push proxy gateway (PPG) 165 and a repackage server 160. These elements are described herein below.

SUPL Server 170

The SUPL server 170 is a specialized application server which, in collaboration with device 110, implements a position determining application identified by an application identifier. The SUPL server 170 may be owned, managed operated and/or controlled by the service provider. The position determining application includes a client-side portion and a server-side portion.

The position determining application allows the SUPL server 170 to collect location information from device 110, To this end, a secure IP tunnel between the client-side and server-side portions of the position determining application is established, and in order to establish the secure IP tunnel, a network-initiated message is issued by the SUPL server 170 and is intended to reach device 110. The network-initiated message can be a "SUPL INIT" message that is structured in accordance with the User Plane Location Protocol (OMA-TS-ULP-V1_0-20070615-A, © 2007 Open Mobile Alliance Ltd., hereby incorporated by reference herein).

The server-side portion of the position determining application, denoted 172, is executed by the SUPL server 170. The client-side portion, when executed by device 110, can take the form of the core-resident client-side position determining application portion 224P or the peripheral-resident client-side position determining application portion 324P.

Figure 4A:
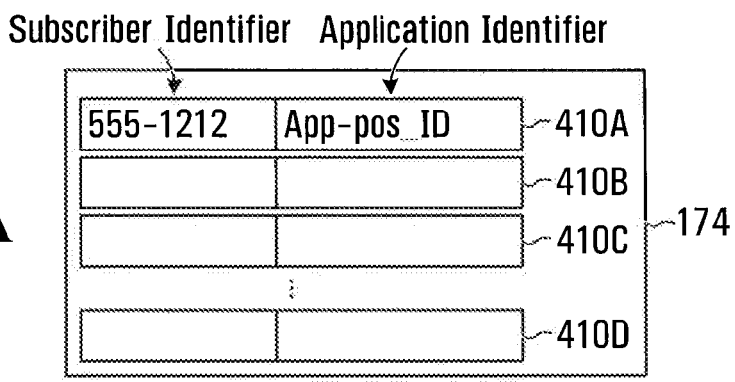
FIG. 4A conceptually illustrates non-limiting example contents of a database that can be used by a server executing a server-side portion of a position determining application to address network-initiated messages destined for a particular communication device.

With additional reference to FIG. 4A, the SUPL server 170 can have access to a database 174, which includes a plurality of records 410A . . . D. In one embodiment, each of the records 410A . . . D is indexed by a subscriber identifier, such as the MEM, IMSI or directory number associated with a device (such as device 110) registered to particular subscriber. The particular subscriber can have a customer relationship with the service provider.

Each of the records indexed by a particular subscriber identifier optionally includes an application identifier of the position determining application. Taking the example of record 410A indexed by an identifier of device 110 (based on the directory number "555-1212"), there may be an application identifier that identifies the position determining application (in this case "APP-POS_ID"), for which the server-side portion is executed by the SUPL server 170. It will be noted that although the application identifier of the position determining application is known, the SUPL server 170 does not necessarily have knowledge about whether the client-side portion of the position determining application is executed by the core processing entity 220 or the peripheral processing entity 320. However, the repackage server 160 described below does have this knowledge. Alternatively, the SUPL, server 170 may have this knowledge and can change a protocol parameter to indicate whether the client-side portion of the position determining application is executed by the core processing entity 220 or the peripheral processing entity 320, but might not be able to perform message formatting.

Generic Application Server 175

The generic application server 175 may be owned, managed operated and/or controlled by the service provider. In an example, the generic application server 175 collaborates with device 110 to implement a variety of "generic" applications, which can include a diagnostic application, a customized news delivery application, a personalized shopping alert notification application and a breathalyzer/vital sign collection application, to name just a few non-limiting possibilities, in each of these cases, a given generic application includes a client-side portion and a server-side portion. There may be more than one generic application server 175, each implementing a corresponding set of generic applications.

Although it is permitted to use a secure IP tunnel between the client-side and server-side portions of the generic application, this is not required. Nonetheless, network-initiated messages still need to be issued by the generic application server 175 and are intended to reach device

110. The network-initiated messages can be structured in accordance with any desired format.

The server-side portion of the generic application, denoted 177, is executed by the generic application server 175. The client-side portion is executed by device 110, and can take the form of one of the core-resident client-side generic application portions 224G (executed by the core processing entity 220) or one of the peripheral-resident client-side generic application portions 324G (executed by the peripheral processing entity 320).

Figure 4B:
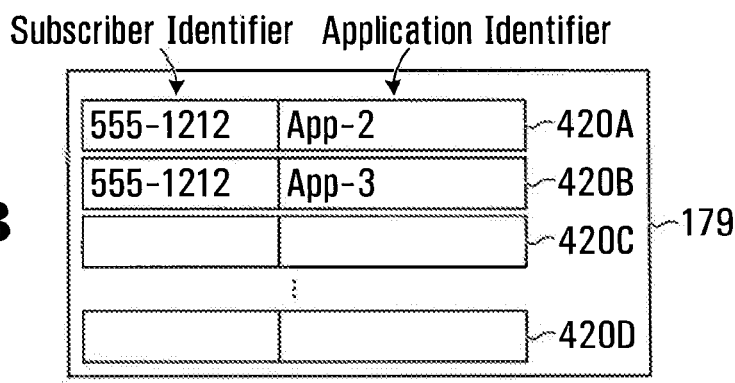
FIG. 4B conceptually illustrates non-limiting example contents of a database that can be used by a server executing a server-side portion of an application other than a position determining application to address network-initiated messages destined for a particular communication device.

With additional reference to FIG. 4B, the application server 175 can have access to a database 179, which includes a plurality of records 420A . . . D. In one embodiment, each of the records 420A . . . D is indexed by a subscriber identifier, such as the MEID, IMSI or directory number associated with a device (such as device 110) associated with a particular subscriber.

Each of the records indexed by a particular subscriber identifier includes an application identifier of a generic application for which the server-side portion is executed by the generic application server 175. It should be appreciated that there may be more than one record indexed by the same subscriber identifier, such that all of the applications for which a client-side portion is executed by device 110 (with the possible exception of the position determining application) may appear in the database 179. Thus, taking the example of record 420A indexed by an identifier of device 110 (based on the directory number "555-1212"), a first application identifier (in this case "APP-2") identifies a first generic application for which the server-side portion is executed by the generic application server 175. Next, taking the example of record 420B indexed by the same identifier of device 110 (based on the directory number "555-1212"), a second application identifier (in this case "APP-3") identifies another generic application for which the server-side portion is executed by the generic application server 175.

It will be noted that although the application identifiers of the various generic applications are known, the generic application server 175 does not necessarily have knowledge about whether the client-side portion of each such generic application is executed by the core processing entity 220 or the peripheral processing entity 320. However, the repackage server 160 described below has such knowledge. Alternatively, the generic application server 175 may have this knowledge and can change a protocol parameter to indicate whether the client-side portion of a given generic application is executed by the core processing entity 220 or the peripheral processing entity 320, but might not be able to perform message formatting.

Push Proxy Gateway 165

The PPG 165 can be used to translate between entities on the packet-switched network 180 that understand a first protocol (e.g., HTTP—HyperText Transfer Protocol) and entities on the packet-switched network 180 that understand another protocol but do not understand the first protocol. One example of such other protocol is SMPP, referred to above, and one example of a network entity that understands SMPP but does not understand HTTP is the SMSC 145, which is connected between the packet-switched network 180 and the SS7 network 185. The PPG 165 understands both protocols and therefore acts as a translator between the SMSC 145 and other entities on the packet-switched network 180 (including the SUPL server 170, the generic application server 175 and servers on the Internet). This is useful when entities on the packet-switched network 180 (such as the SUPL server 170 or the generic application server 175 server) wish to send information via SMS to device 110.

Repackage Server 160

The repackage server 160 can be implemented as an apparatus comprising a microprocessor or other arrangement of circuitry for executing a variety of functions to be described herein below, possibly by reading and executing machine-readable instructions stored on a machine-readable memory medium, such as a disk drive, USB key, etc. The instructions may be stored locally to the apparatus or may be accessible remotely such as over the Internet. The repackage server 160 could be co-located or integated with the SUPL server 170 or the generic application server 175. For simplicity, however, the repackage server 160 is described as being a separate entity from both the SUPL server 170 and the generic application server 175.

The repackage server 160 is connected to the packet-switched network 180 and comprises an interface that can includes an input for receiving communications from the SUPL server 170 and/or the generic application server 175. The interface can also include an output for releasing communications towards the SMSC 145 and/or the PPG 165.

Figure 4C:
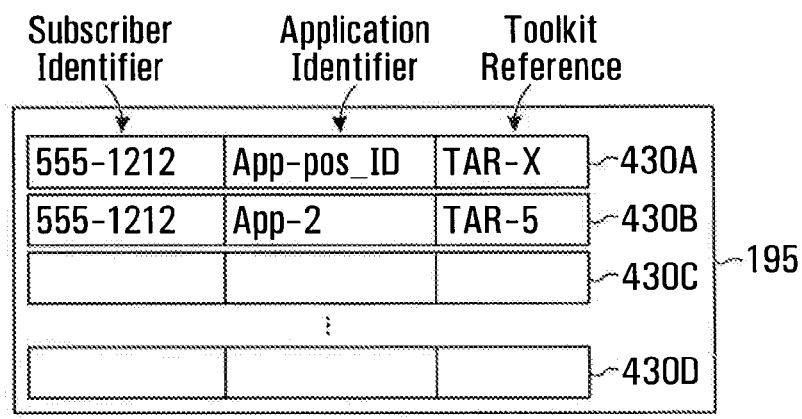
FIG. 4C conceptually illustrates non-limiting example contents of a database that can be used by a repackage server to re-address the network-initiated messages, depending on whether the client-side portion of a given application is executed by core processing circuitry or peripheral processing circuitry.

With additional reference to FIG. 4C, the repackage server 160 can have access to a database 195, which includes a plurality of records 430A . . . D. In one embodiment, each of the records 430A . . . D is indexed by a subscriber identifier, such as the MEID, IMSI or directory number associated with a device (such as device 110) registered to a particular subscriber. Each of the records indexed by a particular subscriber identifier includes an application identifier and a corresponding code or reference, hereinafter referred to as a "toolkit reference". It should be appreciated that there may be more than one record indexed by the same subscriber identifier.

Thus, taking the example of two records 430A, 430B indexed by an identifier of device 110 (based on the directory number "555-1212"), the application identifiers (in this case "APP-POS_ID" and "APP-2") identify particular applications for which the server-side portion is executed by the SUPL server 170 or the generic application server 175, and for which the client-side portion is executed by the peripheral processing entity 320 (in the SIM/UIC card 270) rather than by the core processing entity 220. The toolkit references identify the corresponding peripheral-resident client-side portion of the particular application using a toolkit reference (in this case "TAR-X" and "TAR-5") that the peripheral processing entity 320 understands. A common understanding of the nomenclature can be established ahead of time.

It should be appreciated that in the above embodiment, if a particular application identifier does not appear in any of the records indexed by the identifier of device 110 (such as is the case with "APP-3", which does not appear in any of the records indexed by subscriber identifier "555-1212"), then this signifies that the client-side portion of the corresponding application is executed by the core processing entity 220 rather than the peripheral processing entity 320. However, it should also be appreciated that other embodiments are possible, including embodiments in which the information in the database 195 explicitly specifies, in the case of device 110, whether the client-side portion of a particular application is executed by the core processing entity 230 or by the peripheral processing entity 320 and, in the case of the latter, the corresponding toolkit reference.

It should thus be appreciated that the repackage server 160 has knowledge about whether the client-side position determining application portion is executed by the core processing entity 220 or by the peripheral processing entity 320 (i.e., whether the client-side position determining application portion is the core-resident client-side position determining application portion 224P or the peripheral-resident client-side position determining application portion 324P). Also, the repackage server 160 has knowledge about whether the client-side portions of other applications are executed by the core processing entity 220 or by the peripheral processing entity 320 (i.e., whether the client-side generic application portion is the core-resident client-side generic application portion 224G or the peripheral-resident client-side generic application portion 324G). This knowledge can be provided to the repackage server 160 from a variety of sources, such as (1) the database 195, (2) a registrar server (not shown), or (3) a network-initiated message itself (for some protocols). In the case of a registrar server, a client-side portion of a particular application may send a registration message, which identifies whether it is resident on the core device circuitry or the peripheral. The repackage server 160 would query the registrar server for this information, when required. In the case of a network-initiated message itself, a particular protocol may have a parameter that identifies whether the destination client-side application portion is resident on the core device circuitry or the peripheral. The repackage server 160 would therefore have to correctly format the network-initiated message so that it can be transported through the network and delivered to the target device.

Example of Operation

For the purposes of describing operation of certain ones of the components of the wireless communications network 120 in the context of communication with device 110 (having subscriber identifier "555-1212"), a first application to be considered shall be the position determining application. The position determining application is identified by an application identifier (e.g., "APP-POS_ID", see FIG. 4A) in the database 174. The position determining application consists of a server-side portion executed by the SUPL server 170 (namely, the server-side position determining application portion 172) and a client-side portion executed by either the core processing entity 220 or the peripheral processing entity 320. Whether the client-side portion of the position determining application is executed by the core processing entity 220 or the peripheral processing entity 320 might not be known to the SUPL server 170 but it is known to the repackage server 160 and this knowledge is encoded into the database 195. For example, as shown in FIG. 4C, if the application identifier "APP-POS_ID" appears in one of the records indexed by subscriber identifier "555-1212", then this could signify that the client-side portion of the position determining application is executed by the peripheral processing entity 320 and there may be a corresponding toolkit reference (e.g., "TAR-X").

Now let it be assumed that the server-side position determining application portion 172 (residing on SUPL server 170) wishes to send a network-initiated message to the client-side portion of the position determining application executed by device 110 (having subscriber identifier "555-1212"). In accordance with a specific non-limiting embodiment of the present invention, the network-initiated message can be a SUPL INIT message. It will be recalled that the SUPL server 170 does not necessarily know whether the client-side portion of the position determining application is being executed by the peripheral processing entity 320 or by the core processing entity 220.

The server-side position determining application portion 172 can consult the database 174 based on the subscriber identifier of device 110 (in this case, "555-1212") in order to determine the application identifier (in this case, "APP-POS_ID") to be used for identifying the position determining application to device 110.

Figure 5:
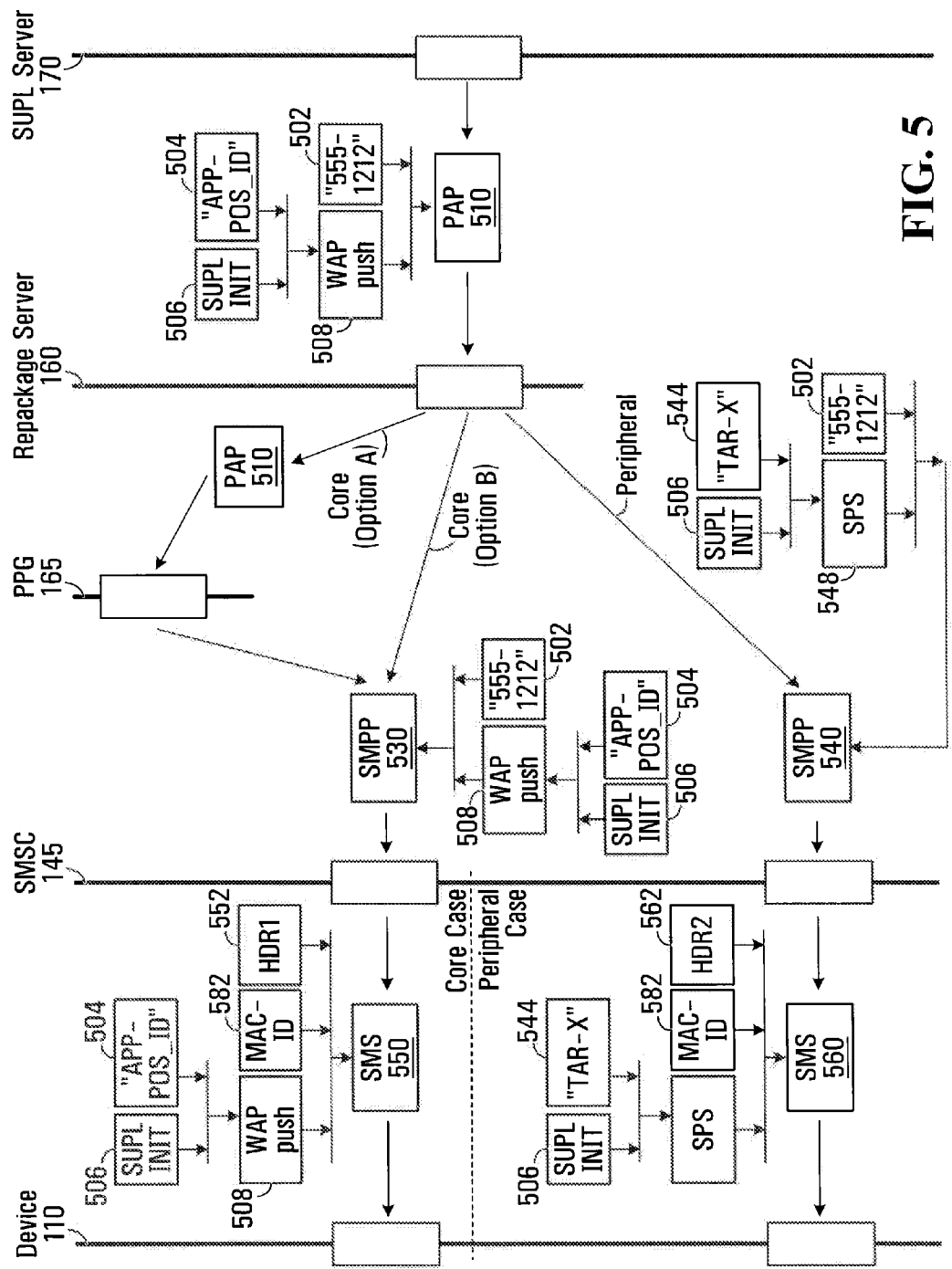
FIG. 5 is a message flow diagram illustrating functionality of the repackage server, which generates different messages depending on whether the client-side portion of a given application is executed by core processing circuitry or peripheral processing circuitry, in accordance with a specific non-limiting embodiment of the present invention.

With reference now to the flow diagram in FIG. 5, the server-side position determining application portion 172 packages the application identifier ("APP-POS_ID") into an application identifier data element 504, and then formats the application identifier data element 504 and the SUPL INIT message (denoted 506) into a packet data unit (PDU). In a non-limiting embodiment, the PDU containing the application identifier data element 504 and the SUPL INIT message 506 can be formulated as a WAP push message 508 in accordance with the Wireless Session Protocol (RVSP) Specification (WAP-230-WSP-20010705-a, Approved Version 5 July 2001, © 2001, Wireless Application Forum, Ltd., hereby incorporated by reference herein). Other formats can be used.

The server-side position determining application portion 172 then packages the subscriber identifier ("555-1212") into a subscriber identifier data element 502, and then formats the WAP push message 508 and the subscriber identifier data element 502 into a message 510 that is sent into the packet-switched network 180. The message 510 may be in accordance with the Push Access Protocol (WAP-247-PAP-20010429-a, Version 29-April 2001, © 1999-2001, Wireless Application Protocol Forum, Ltd., hereby incorporated by reference herein). Accordingly, the message 510 can be formulated as a PAP message transported using an HTTP POST request. As such, the PAP message 510 can include a payload containing the WAP push message 508 and a header containing the subscriber identifier data element 502. Of course, those skilled in the art will appreciate that the Push Access Protocol is merely being used as an example and that other formats and protocols can be used.

The PAP message 510 can be addressed to the repackage server 160. Alternatively, the PAP message 510 can be addressed to the PPG 165 but then intercepted by (i.e., redirected to) the repackage server 160 through manipulation of routing tables within the packet-switched network 180.

Upon receipt of the PAP message 510, the repackage server 160 extracts the subscriber identifier data element 502 from its header and extracts the WAP push message 508 from its payload. As mentioned above, the destination identifier data element 502 can include a directory number (in this example, "555-1212"), but it could also be an Electronic Serial Number (ESN), International Mobile Subscriber Identifier (IMSI), and so on. Also as mentioned above, the WAP push message 508 may include the application identifier data element 504 and the SUPL INIT message 506.

The repackage server 160 then determines whether the client-side portion of the position determination application resides on core device circuitry (e.g., the core processing entity 220) or on a peripheral (such as the SIM/UIC card 270), This will determine where to direct the SUPL INIT message 506 in the received WAP push message 508. This determination can be made by consulting the database 195 based on the subscriber identifier data element 502 and the application identifier data element 504 extracted from the WAP push message 508. In one embodiment, if the database 195 contains a toolkit reference associated with the subscriber identifier data element 502 and the application identifier data element 504, then this signals that the client-side portion of the position determination application resides on a peripheral, while absence of a toolkit reference signals that the client-side portion of the position determination application resides on core device circuitry. In other embodiments, the database 195 may include a more explicit indication of whether the client-side portion of the position determination application resides on core device circuitry or on a peripheral. In yet other cases, a query to a network element may be performed to ascertain the toolkit reference, in the case where the client-side portion of the position determination application resides on a peripheral.

One possible outcome of the determination made by the repackage server 160 is therefore that the client-side portion of the position determination application resides on core device circuitry (e.g., the core processing entity 220). Two options are now possible. Under option A, the repackage server 160 forwards the received PAP message 510 in its entirety to the PPG 165, which then converts the PAP message 510 into an SMPP message 530. Specifically, the PPG 165 extracts the WAP push message 508 and the subscriber identifier data element 502 from the PAP message 510, and then places these two data elements into the SMPP message 530, which is a message formulated in accordance with SMPP (Short Message Peer to Peer Protocol Specification v3.4, 12 Oct. 1999 Issue 1.2, © 1999 SMPP Developers Forum. Under option B, the repackage server itself converts the received PAP message 510 into the SMPP message 530. The SMPP message 530 is forwarded to the SMSC 145.

On the other hand, another possible outcome of the determination made by the repackage server 160 is that the client-side portion of the position determination application resides on a peripheral (such as the SIM/UIC card 270). In this case, the repackage server 160 generates an SMPP message 540 which is slightly different from the SMPP message 530. Specifically, the repackage server 160 obtains a toolkit reference data element 544 that is associated with the subscriber identifier data element 502 and the application identifier data element 504. For example, considering FIG. 4C, the toolkit reference associated with a subscriber identifier having the value "555-1212" and an application identifier having a value "APP-POS ID" has the value "TAR-X". Then, the toolkit reference data element 544 and the SUPL NIT message 506 are combined into an SPS message 548, which can have a "secured packet structure" (SPS) format in accordance with ETSI TS 102 225 V8,2.0 (2009-04), "Smart Cards; Secured packet structure for UICC based applications" (Release 8), © European Telecommunications Standards Institute 2009, hereby incorporated by reference herein, The SPS message 548 and the subscriber identifier data element 502 are placed into the SMPP message 540. The SMPP message 540 is forwarded to the SMSC 145.

Figure 6:
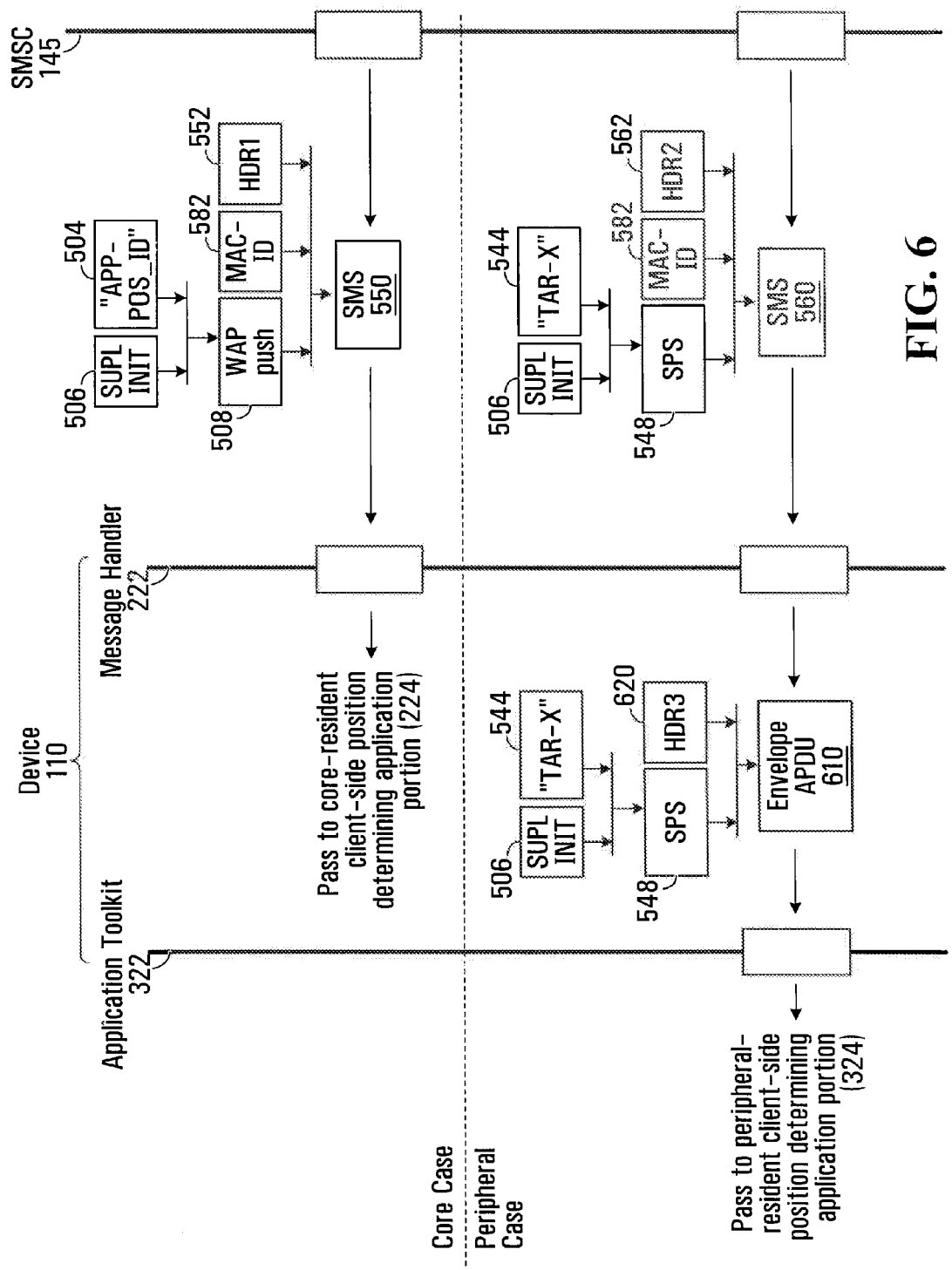
FIG. 6 is a message flow diagram illustrating processing of SMS messages created by a SMSC from the messages sent by the repackage server, as a function of whether the client-side portion of a given application is executed by core processing circuitry or peripheral processing circuitry, in accordance with a specific non-limiting embodiment of the present invention.
Figure 8D:
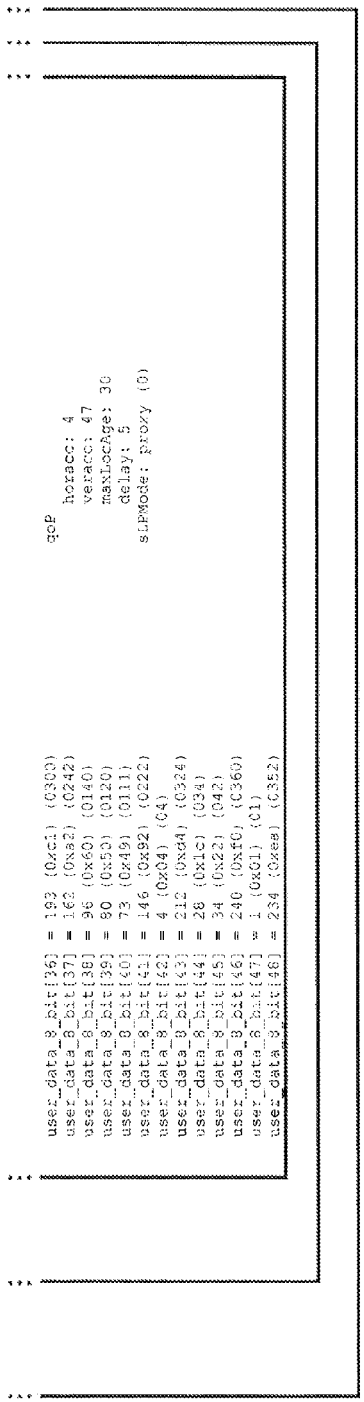

At the SMSC 145, the received SMPP message (which is either SMPP message 530 or SMPP message 540) is converted into an SMS message. Specifically, SMPP message 530 would be converted into an SMS message 550, while SMPP message 540 would be converted into an SMS message 560. Both SMS messages 550, 560 are compliant with SMS ("short message service", as described in 3GPP TS 03.40 V7.5.0 (2001-12), 3rd Generation Partnership Project; Technical Specification Group Terminals; Technical realization of the Short Message Service (SMS); Release 1998. However, because the contents of the SMPP messages 530, 540 is different, so too will be the content of the SMS message 550, 560, as will now be explained with reference to FIG. 6.

To be precise, additional reference will be made to FIGS. 7A-7D when now describing SMS message 550, which is created from SMPP message 530 and is applicable to the case where the client-side portion of the position determination application was found to reside on core device circuitry (e.g., the core processing entity 220). Specifically, SMS message 550 includes the WAP push message 508 which, it will be recalled, includes the SUPL NIT message 506 and the application identifier data element 504. In addition, SMS message 550 includes a Medium Access Control (MAC) layer data element 582, which is a lower-layer identifier of device 110. Additionally, SMS message 550 includes a header 552, which is indicative of the fact that the WAP push message 508 is destined for the core processing entity 220.

The MSC 135 receives the SMS message 550 from the SMSC 145, determines that it is destined for device 110 (based on the Medium Access Control (MAC) layer data element 582) and sends the SMS message 550 to device 110 in a suitable format. SMS message 550 thus travels from the SMSC 145 to the MSC 135 to the radio network controller 125 to the base station 105 to device 110. Upon receipt of SMS message 550, the message handler 222 decodes the header 552 which, it will be recalled, is indicative of the fact that the WAP push message 508 is destined for the core processing entity 220. As such, the WAP push message 508 is processed by the core processing entity 220, Which extracts the application identifier data element 504 (in this case, "APP-POS_ID") and the SUPL INIT message 506. The core processing entity 220 then passes the SUPL INIT message 506 to the core-resident client-side position determining application portion, which could mean launching the application portion, reviving the application portion (if it was dormant) or storing the SUPL INIT message 506 in an area of the memory 260 accessed by the application portion. This may lead to establishment of a secure user plane connection with the server-side position determining application portion 172 as intended.

On the other hand, reference will be made to FIGS. 6 and 8A-8D when now describing SMS message 560, which is created from SMPP message 540 and is applicable to the case where the client-side portion of the position determination application was found to reside on peripheral circuitry (e.g., the peripheral processing entity 320). Specifically, SMS message 560 includes the SPS message 548 which, it will be recalled, includes the SUPL INIT message 506 and the toolkit reference data element 544. In addition, SMS message 560 includes the aforementioned Medium Access Control (MAC) layer data element 582. Additionally, SMS message 560 includes a header 562, which is indicative of the fact that the SPS message 548 is destined for the peripheral processing entity 320.

Figure 11:
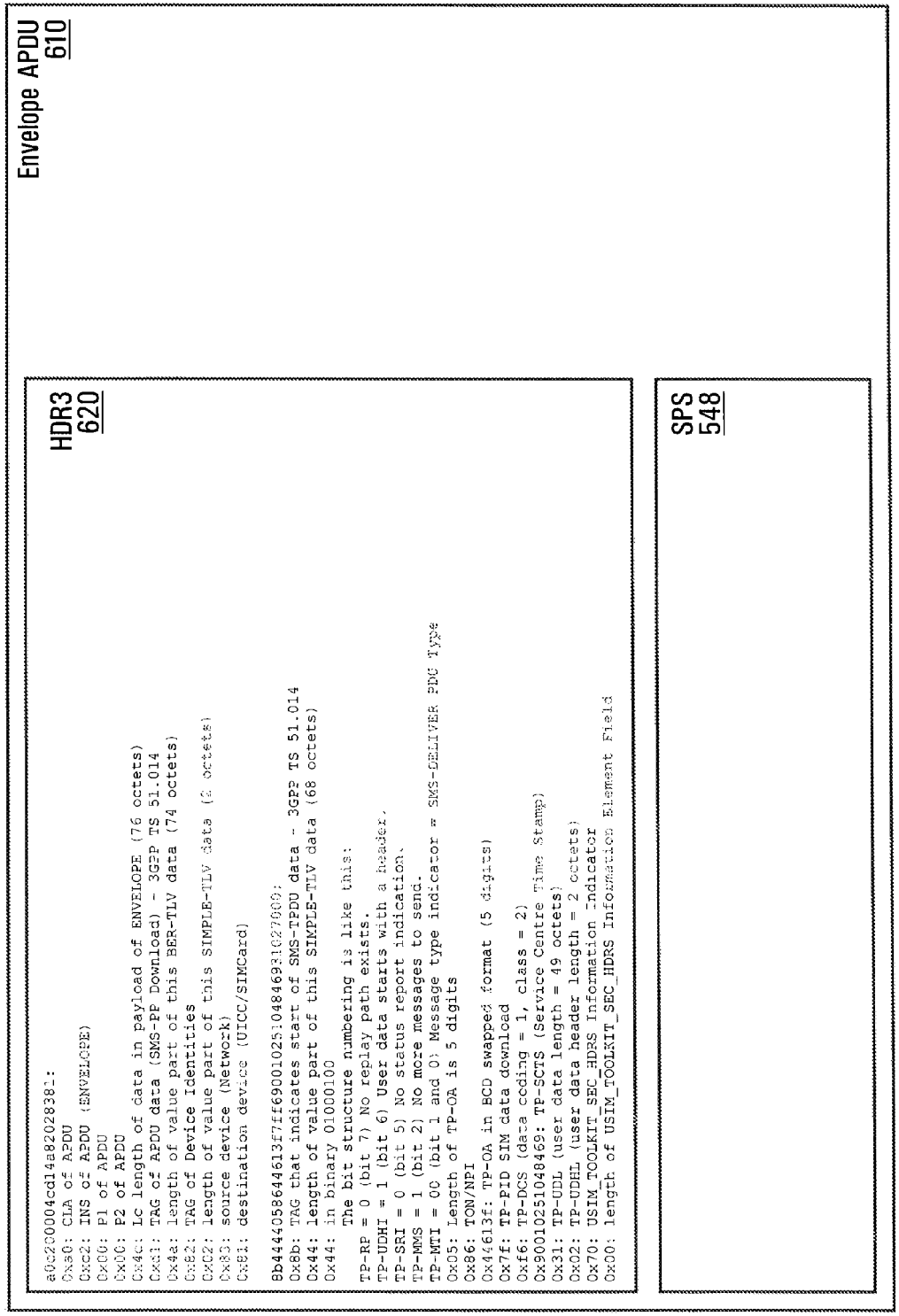
FIG. 11 shows content of an envelope application protocol data unit (APDU) that can be transmitted to the peripheral processing circuitry, in accordance with a specific non-limiting embodiment of the present invention.

The MSC 135 receives the SMS message 560 from the SMSC 145, determines that it is destined for device 110 (based on the Medium Access Control (MAC) layer data element 582) and sends the SMS message 560 to device 110 in a suitable format. SMS message 560 thus travels from the SMSC 145 to the MSC 135 to the radio network controller 125 to the base station 105 to device 110. Upon receipt of SMS message 560, the message handler 222 decodes the header 562 which, it will be recalled, is indicative of the fact that the SPS message 548 is destined for the SMS/UIC card 270. Accordingly, the message handler 222 creates a message (referred to herein as an envelope APDU 610), which is destined for the SIM/UIC card 270. Specifically, with additional reference to FIG. 11, the envelope APDU 610 includes the SPS message 548 (which includes the SUPL INIT message 506 and the toolkit reference data element 544) and a header 620. The header 620 is specially formulated to indicate to the peripheral processing entity 320 that the envelope APDU 610 contains an SPS message (in this case, SPS message 548). For example, the header may be a 3GPP TS 3.40 header. The envelope APDU 610 may be sent to the SIM/UIC card 270 using the Bearer Independent Protocol (BIP), as described in ETSI TS 102 223: "Smart Cards; Card Application Toolkit (CAT) (Release 7)".

At the SIM/UIC card 270, the envelope APDU 610 is processed by the application toolkit 322, which extracts the SPS message 548 and the header 620. The contents of the header 620 indicates to the peripheral processing entity 320 that the envelope APDU 610 includes an SPS message (in this case, SPS message 548). Accordingly, the application toolkit 322 extracts the toolkit reference data element 554 (in this case, "TARA") and the SUPL INIT message 506 from the SPS message 548. The peripheral processing entity 320 then passes the SUPL INIT message 506 to the peripheral-resident client-side position determining application portion, winch could mean launching the application portion, reviving the application portion (if it was dormant) or storing the SUPL INIT message 506 in an area of the memory 360 accessed by the application portion. This may lead to establishment of a secure user plane connection with the server-side position determining application portion 172 as intended.

Thus, it will be appreciated that the SUPL server 170 can continue to issue SUPL INIT messages 506 without knowledge of, or concern for, the precise entity that executes the client-side position determining application portion. That is to say, the SUPL server 170 can be a legacy SUPL server that continues to operate unchanged, while any messages formatting changes required by the advanced capabilities offered by device 110 will be taken care of by the repackage server 160.

Those skilled in the art will appreciate that references made above to SMS can be expanded to MMS, which extends the core SMS capability to non-text media (graphics, video etc.).

Those skilled in the art will also appreciate that the above description, which has been provided in the context of a position determining application, can be directly adapted to the context of applications other than the position determining application. This includes applications consisting of a server-side portion executed by the application server 175 and a client-side portion executed by either the core processing entity 220 (e.g., by the core-resident client-side generic application portion) or the peripheral processing entity 320 (e.g., by the peripheral-resident client-side generic application portion), as the case may be. In each of these cases, it will be appreciated that the generic application server 175 can continue to issue network-initiated messages without knowledge of, or concern for, the precise entity that executes the client-side generic application portion.

For example, consider the following example applications.

Media Player application

A subscriber launches the media player application, which has a server-side application portion running on the generic application server 175 and a client-side application portion running on either the core processing entity 220 or the peripheral processing entity 320 (on the SIM/UIC card 270). The subscriber describes the programming content that interests him/her and some search criteria. For instance, he/she could request that the application inform him/her whenever "The Situation Room" on CNN discusses the war in Libya. As CNN airs new broadcasts of "The Situation Room", the service provider records timestamps whenever the war in Libya is indeed discussed. The generic application server 175 hosts the recently aired broadcasts of "The Situation Room" and it sends network-initiated messages to the media player, via SMS as described above. That is to say, the network-initiated messages in the context of the media player application take the place of the SUPL INIT message 506 described earlier. Such network-initiated message may contain "Message A1" that identifies a particular broadcast of "The Situation Room" and the time when the war in Libya was discussed. When the subscriber has time, he/she launches his/her media player and sees one or more notifications that were generated by his/her search criteria. He/she selects one of these and the media player initiates a session with the generic application server. This allows the subscriber to quickly access and view a segment on "The Situation Room" about the war in Libya. Not only has one of the subscriber's favorite programs been recorded, but the service provider has searched through the program to locate the specific segments of interest (if any).

"Message A1" is part of some Protocol A that exists between the client-side media player application portion and the server-side the media player application portion, which hosts previously aired TV broadcasts. While the generic application server 175 might assume that the subscriber has launched the client-side portion of the application running on the core processing entity, this may not be the case. Therefore, the SMS message that is destined for the SMSC 145 will be intercepted by the repackage server 160 and may have to be reformatted, depending on where the client-side portion of the media player application is installed.

Product Finder Application

A similar description can be provided for the case of a product finder application. Specifically, consider the case where a subscriber desires to purchase a particular product, such as a particular brand and type of shoes, but only when the price drops to a certain level. The subscriber is not in a rush to buy these shoes and he/she will only consider making a purchase if he/she just happens to pass by a store that offers them at, or below, the desired price set by the subscriber (either explicitly or retained in the subscriber's mind). The subscriber launches a client-side product finder application, which is executed either by the core processing entity 220 or by the peripheral processing entity 320. The subscriber can provide (e.g., verbalize) the details of the desired product (and possible also the desired price). At this point, the subscriber goes about his/her daily life, while the server-side portion of the product finder application executes on the generic application server 175 and monitors the subscriber's location. The generic application server 175 also dynamically searches the product offerings of retailers near the subscriber. Some retailers may voluntarily share up-to-date product offerings with the service provider to facilitate this service. When the subscriber passes a retailer with the shoes he/she wants (at a satisfactory price), the server-side application portion sends a network-initiated "Message B1" to the subscriber's client-side portion of the product finder application. The client launches and provides an immediate audio message, such as "Your service provider has found the shoes you want. They cost $89 at The Bay, which is one block South of your present location. Please open the product finder application/click. here for more details." The subscriber may launch the client-side of the product finder application, which initiates a session with the server-side portion to download information such as, e.g., a picture of the shoes offered at the Bay, and any additionally items that the Bay thinks may interest this subscriber. It is expected that the sharing of these additional items can be made less irritating to the subscriber than purely unsolicited advertisements. In this case, the subscriber has been made happy since the service provider (and the retailer) have found the product he/she desired. Retailers, like the Bay, may pay the service provider a fee for the opportunity to send advertisements after a successful product find, like the one above.

"Message B1" is part of some Protocol B that exists between the client-side product finder application portion and the server-side the product finder application portion, which periodically tracks the location of a subscriber, while searching for products he/she wants. While the generic application server 175 might assume that the subscriber has launched the client-side portion of the application running on the core processing entity, this may riot be the case. Therefore, the SMS message that is destined for the SMSC 145 will be intercepted by the repackage server 160 and may have to be reformatted, depending on where the client-side portion of the product finder application is installed.

Breathalyzer Application

In another possibility, it may be desirable from a law enforcement perspective to monitor more closely those drivers with a history of reckless driving. The service provider could offer a service that allows law enforcement to (1) determine quickly if a subscriber is driving and (2) determine quickly if that subscriber has been drinking. It is assumed that the subscriber of interest carries device 110 while driving. A Bell breathalyzer client, executed by the core processing entity 220 or the peripheral processing entity 320 (on the SIM/UIC card 270) periodically communicates with a server-side portion of the breathalyzer application run by the generic application server 175 in order to report the current location of the subscriber and his/her driving speed. The generic application server 175 notifies law enforcement that the subscriber is driving, or simply lets law enforcement pull this information on demand. At some point, law enforcement may ask the generic application server 175 to initiate a breathalyzer test with the subscriber. The server-side of the breathalyzer application may therefore send a network-initiated "Message C1" to the client-ide breathalyzer application portion (which, it will be recalled), may run on the core processing entity 220 or the peripheral processing entity 320. The client-side application launches and may promptly output an audio message, such as "Law enforcement have requested that you take a breathalyzer test within the next 30 minutes." The subscriber pulls over and takes the test using a Bluetooth-enabled breathalyzer that the subscriber may be required to keep in his/her car. The breathalyzer wirelessly sends the results to the client-side breathalyzer application portion. The client-side breathalyzer application portion send the results to the server-side portion, at which point the generic application server 175 forwards the results to law enforcement.

"Message C1" is part of some Protocol C that exists between the client-side breathalyzer application portion and the server-side the product finder application portion, which monitors the driving speed of a subscriber, informs him/her when a breathalyzer test must be taken, and forwards the results to law enforcement. While the generic application server 175 might assume that the subscriber has launched the client-side portion of the application running on the core processing entity, this may not be the case. Therefore, the SMS message that is destined for the SMSC 145 will be intercepted by the repackage server 160 and may have to be reformatted, depending on where the client-side portion of the breathalyzer application is installed.

While the above has provided a description of certain examples and non-limiting embodiments, this has been done for illustrative purposes only, and is not intended to be a definition of the invention, which is provided by the claims appended hereto.

What is claimed is:

1. An apparatus comprising:
an input for receiving from a first network entity a first communication that includes at least (i) a network-initiated message generated by a server-side portion of an application that also has a corresponding client-side portion and (ii) a first application identifier associated with the application;

a processing entity for consulting a database based at least on the first application identifier in an attempt to identify a second application identifier associated with the application; and an output for releasing to a second network entity a second communication that includes at least (i) the network-initiated message and (ii) either the second application identifier, if the attempt was successful, or the first application identifier; if the attempt was unsuccessful, wherein the first application identifier indicates that the client-side portion of the application is executed by core device processing circuitry and wherein the second application identifier indicates that the client-side portion of the application is executed by peripheral processing circuitry.

2. A method for execution by a network element of a communications network, the method comprising:

receiving from a first network entity a first communication that includes at least (i) a network-initiated message generated by a server-side portion of an application that also has a corresponding client-side portion and (ii) a first application identifier associated with the application;

consulting a database based at least on the first application identifier in an attempt to identify a second application identifier associated with the application; and releasing to a second network entity a second communication that includes at least (i) the network-initiated message and (ii) either the second application identifier, if the attempt was successful, or the first application identifier; if the attempt was unsuccessful, wherein the first application identifier indicates that the client-side portion of the application is executed by core device processing circuitry and wherein the second application identifier indicates that the client-side portion of the application is executed by peripheral processing circuitry.

3. The method defined in claim 2, wherein the first application identifier indicates that the client-side portion of the application is executed by core processing circuitry of a communication device and wherein the second application identifier indicates that the client-side portion of the application is executed by processing circuitry residing on hardware connectable to and disconnectable from the communication device.

4. The method defined in claim 2, wherein the first application identifier indicates that the client-side portion of the application is executed by core processing circuitry of a communication device and wherein the second application identifier indicates that the client-side portion of the application is executed by processing circuitry residing on a SIM/UIC card insertable into a SIM/UIC card slot of the communication device.

5. The method defined in claim 2, further comprising receiving a destination identifier associated with a destination for which the network-initiated message is destined, and wherein the database is consulted further based at least on the first application identifier and the destination identifier.

6. The method defined in claim 5, wherein the destination identifier comprises at least one of a directory number, an Electronic Serial Number (ESN), an International Mobile Subscriber Identifier (IMSI) and a Mobile Equipment Identifier (MEID).

7. The method defined in claim 2, wherein the second communication is a copy of the first communication when the attempt is unsuccessful.

8. The method defined in claim 2, wherein the first communication includes a WAP Push message comprising the network-initiated message and the first application identifier.

9. The method defined in claim 8, further comprising receiving a destination identifier associated with a destination for which the network-initiated message is destined, wherein the first communication further comprises the destination identifier.

10. The method defined in claim 2, wherein the first communication is formulated ire accordance with the Push Access Protocol.

11. The method defined in claim 2, further comprising formulating the second communication in accordance with the Short Message Peer to Peer Protocol when the attempt is successful.

12. The method defined in claim 11, further comprising formulating the second communication is a message in accordance with the Short Message Peer to Peer Protocol also when the attempt is unsuccessful.

13. The method defined in claim 11, further comprising formulating the second communication in accordance with the Push Access Protocol when the attempt is unsuccessful.

14. The method defined in claim 11, wherein the second communication is formulated to include a secured packet structure (SPS) packet comprising the network-initiated message and the second application identifier.

15. The method defined in claim 14, further comprising receiving a destination identifier associated with a destination for which the network-initiated message is destined, wherein the second communication is formulated to further include the destination identifier.

16. The method defined in claim 2, wherein the second network entity comprises a short message service center (SMSC).

17. The method defined in claim 2, further comprising releasing the second communication to a Push Proxy Gateway when the attempt is unsuccessful and releasing the second communication to a short message service center (SMSC) when the attempt is successful.

18. The method defined in claim 2, further comprising releasing the second communication to a short message service center (SMSC) when the attempt is unsuccessful and also when the attempt is successful.

19. The method defined in claim 2, further comprising releasing the second communication to a short message service center (SMSC) via a Push Proxy Gateway when the attempt is unsuccessful and releasing the second communication directly to the SMSC when the attempt is successful.

20. The method defined in claim 2, wherein the application is a position determining application.

21. The method defined in claim 20, wherein the network-initiated message comprises a SUPL NIT message in accordance with the User Plane Location Protocol.

22. The method defined in claim 2, wherein the second application identifier comprises a toolkit reference.

23. The method defined in claim 2, wherein the application is a diagnostic application.

24. The method defined in claim 2, wherein the application is a customized news delivery application.

25. The method defined in claim 2, wherein the application is a personalized shopping alert notification application.

26. The method defined in claim 2, wherein the application is at least one of a breathalyzer application and a vital sign collection application.

27. A non-transitory computer-readable storage medium comprising a set of instructions for execution by a network element of a communications network, wherein execution of the set of instructions by the network element causes the network element to execute a method that includes:
  receiving from a first network entity a first communication that includes at least (i) a network-initiated message generated by a server-side portion of an application that also has a corresponding client-side portion and (ii) a first application identifier associated with the application;
  consulting a database based at least on the first application identifier in an attempt to identify a second application identifier associated with the application; and
  releasing to a second network entity a second communication that includes at least (i) the network-initiated message and (ii) either the second application identifier, if the attempt was successful, or the first application identifier, if the attempt was unsuccessful,
  wherein the first application identifier indicates that the client-side portion of the application is executed by core device processing circuitry and wherein the second application identifier indicates that the client-side portion of the application is executed by peripheral processing circuitry.

* * * * *